(12) United States Patent
Talvensaari et al.

(10) Patent No.: US 10,306,293 B2
(45) Date of Patent: May 28, 2019

(54) SYSTEMS AND METHODS OF SERVER BASED INTERACTIVE CONTENT INJECTION

(71) Applicant: WOWZA MEDIA SYSTEMS, LLC, Golden, CO (US)

(72) Inventors: Michael Dean Talvensaari, Los Gatos, CA (US); James S. Sherry, Broomfield, CO (US); Jan Martin Borgersen, San Jose, CA (US); Scott Kellicker, Worthington, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/653,128

(22) Filed: Jul. 18, 2017

(65) Prior Publication Data

US 2019/0028758 A1    Jan. 24, 2019

(51) Int. Cl.
*H04N 21/431* (2011.01)
*H04N 21/472* (2011.01)
*H04N 21/478* (2011.01)
*H04N 21/858* (2011.01)
*H04N 21/2187* (2011.01)
*H04N 21/4788* (2011.01)
*H04N 21/258* (2011.01)
*H04N 21/81* (2011.01)
(Continued)

(52) U.S. Cl.
CPC ....... *H04N 21/4316* (2013.01); *H04L 65/601* (2013.01); *H04L 67/02* (2013.01); *H04N 21/2187* (2013.01); *H04N 21/25891* (2013.01); *H04N 21/44016* (2013.01); *H04N 21/472* (2013.01); *H04N 21/4788* (2013.01); *H04N 21/47202* (2013.01); *H04N 21/47815* (2013.01); *H04N 21/812* (2013.01); *H04N 21/858* (2013.01)

(58) Field of Classification Search
CPC .......... H04N 7/17318; H04N 21/8543; H04N 21/4316; H04N 21/8586; H04N 7/088; H04N 21/2393; H04N 21/4782; H04N 21/8545; H04N 21/25891; H04N 21/4722; H04N 21/4882; H04N 21/812; H04N 21/858; H04N 21/4532; H04N 21/4758; H04N 21/2365; H04N 21/4347; H04N 19/46; H04N 21/23412; H04N 21/8126; H04N 21/8173; H04N 21/4307; H04N 21/431; H04N 21/4348; H04N 5/272; G06F 3/048
See application file for complete search history.

(56) References Cited

U.S. PATENT DOCUMENTS 8,571,936 B2   10/2013  Geer, III et al.
2003/0193518 A1*  10/2003  Newnam ............ H04N 7/17318
                                                     715/719
(Continued)

*Primary Examiner* — Hai V Tran
(74) *Attorney, Agent, or Firm* — Toler Law Group, PC

(57) ABSTRACT

A method includes receiving, at a media server, a request for a media stream from a client device. The method further includes sending, from the media server, a combined media stream to the client device via a streaming session. The combined media stream includes the requested media stream and interactive content. The interactive content is configured to cause a media player of the client device to display the interactive content concurrently with the media stream.

20 Claims, 11 Drawing Sheets

(51) Int. Cl.
*H04N 21/44* (2011.01)
*H04L 29/06* (2006.01)
*H04L 29/08* (2006.01)

(56) References Cited

U.S. PATENT DOCUMENTS

| | | | |
|---|---|---|---|
| 2004/0139480 A1* | 7/2004 | Delpuch | H04N 21/2358 |
| | | | 725/135 |
| 2009/0063280 A1 | 3/2009 | Wurster et al. | |
| 2010/0153990 A1 | 6/2010 | Ress et al. | |
| 2010/0238994 A1* | 9/2010 | Cakareski | H04N 21/234327 |
| | | | 375/240.01 |
| 2011/0112915 A1* | 5/2011 | Geer, III | G06Q 30/00 |
| | | | 705/14.73 |
| 2014/0195675 A1* | 7/2014 | Silver | H04L 65/1083 |
| | | | 709/224 |
| 2014/0281002 A1* | 9/2014 | Sun | H04L 29/06455 |
| | | | 709/231 |
| 2015/0030152 A1* | 1/2015 | Waxman | H04M 3/5233 |
| | | | 379/265.11 |
| 2015/0033255 A1* | 1/2015 | Neumann | H04N 21/25891 |
| | | | 725/34 |
| 2015/0382042 A1* | 12/2015 | Wagenaar | H04N 21/26258 |
| | | | 725/34 |
| 2016/0173961 A1* | 6/2016 | Coan | H04N 21/812 |
| | | | 725/32 |
| 2017/0111418 A1* | 4/2017 | Warren | H04N 21/4758 |
| 2017/0332113 A1* | 11/2017 | Haritaoglu | H04N 21/23424 |

* cited by examiner

Second Interactive Content 515 (e.g., quiz)

— 130

Question 4: For which movie did the Actor who plays the Villain win an Oscar?

Answer A
Answer B
Answer C
Answer D

@gametime: <tap here to send msg>

Question 4/10
Score: 3/10

Media Stream 120
(e.g., VOD movie)

SYSTEMS AND METHODS OF SERVER BASED INTERACTIVE CONTENT INJECTION

BACKGROUND

The popularity of the Internet, coupled with the increasing capabilities of mobile electronic devices, has provided consumers with the ability to enjoy multimedia content on the go. For example, live content (e.g., sports events) and video on demand (VOD) content (e.g., television shows and movies) can be streamed via the Internet to electronic devices (e.g., computers, mobile phones, or Internet-enabled televisions). To playback media streams, electronic devices typically execute a media player software application. Some operating systems for mobile phones and tablet computers have built-in media players.

Media streaming is typically a "passive" activity for a viewer. That is, viewers may not have the ability to interact with the media stream other than to perform basic start, pause, stop, fast forward, or rewind operations. To increase audience excitement or to collect audience data, some content providers have recently attempted to incorporate interactive content (e.g., content a user may interact with, including selectable objects or icons) into the process of viewing a media stream. One example of interactive content is a survey which is displayed at a client device and which asks a viewer whether he or she enjoyed a just-viewed advertisement. To add such interactivity to the media stream viewing experience, a media server may generally cause the interactive content to be retrieved and rendered by the client device. For example, the media server may instruct or direct the client device (e.g., a media player installed on an electronic device) to fetch the interactive content (e.g., an alternate media stream) from an interactive content domain (content source separate from the media server) for display before (e.g., pre-roll) or during display of a user requested/selected media stream by including flags or redirects/requests that direct the client device to the interactive content domain.

However, advertisement blocking software employed on the client device has the ability to block client-retrieved interactive content. For example, advertisement blocking software may block redirects and/or requests to internet domains on a blocked domain list, which generally includes interactive content domains. A media stream with blocked or missing interactive content may detract from an overall user experience (e.g., the interactive content being blocked is not actually advertising, but may instead be content the user was expecting to see, and the user may thus be left wondering whether there was a malfunction at the server or at his/her viewing device).

SUMMARY

Implementations described herein are directed to server-side injection of interactive content into a media stream to be delivered via a streaming session to a client device. A media server injects the interactive content into the media stream to generate a combined media stream, and the media server is configured to send the interactive content in the combined media stream as executable code, such as Hypertext Markup Language (HTML) code or Extensible Markup Language (XML) code, to a client device. A media player of the client device executes the executable code and renders the interactive content, and the interactive content is displayed concurrently with video content of the media stream. In a particular implementation, the client device displays the interactive content overlaid on top of the video content of the media stream using the media player. In an illustrative example, the interactive content is rendered in a first layer and the video content is displayed in a second layer underneath the first layer (e.g., partially obscured by the interactive content). In other implementations, the client device displays the interactive content next to (e.g., side-by-side with) the video content.

By enabling server-controlled, server-side injection of interactive content directly into a media stream (e.g., during a streaming session associated with a media stream), the techniques of the present disclosure enable interactive content to be displayed by a client device (e.g., the interactive content is not blocked by advertisement blocking software of the client device). Moreover, such interactive content may be rendered concurrently with the audio/video content of the media stream, such as overlaid on top of the video content. Providing interactive content concurrently with the audio/video content of the media stream may provide an enhanced user experience (e.g., greater interactivity and immersion) as compared to providing the interactive content as pre-roll content that is displayed prior to the media stream or as an alternative media stream that the media player switches to/from during display of the media stream.

In some examples of the present disclosure, the media server is configured to provide the interactive content to the client device via a data channel or a control channel of the media steam. In some implementations, the interactive content is sent along with packets that include video data or audio data. For example, the interactive content may be sent as additional payload data in a packet containing video data. The interactive content may be associated with chunks of video in the packet and displayed during video frames corresponding to the chunks of video. Additionally or alternatively, the interactive content may be sent in packets (e.g., interactive content packets) that do not contain video data or audio data. In a particular implementation, header data or metadata of the packet containing the interactive content may indicate when and where to display the interactive content (e.g., which video frames to display the interactive content with and where on the display).

In particular aspects, a media server injects, into a media stream, interactive content as executable code and the interactive content is displayed at a client device. To illustrate, the media server may inject HTML or XML code into the media stream. The executable code may include specific instructions indicating when and/or how to display the interactive content. After receiving the executable code for rendering the interactive content, the media player of the client device is able to display (e.g., overlay) the interactive content during playback of the media stream (e.g., display the interactive content and the media stream concurrently). Additionally, the media player displays the interactive content without retrieving the interactive content from an interactive content domain. By displaying the interactive content without retrieving the interactive content from an interactive content domain, the interactive content is displayed without invoking retrieval operations by the client device which may be blocked.

In some implementations, the client device still generates requests to retrieve data associated with the interactive content. To illustrate, the interactive content may include links to media files, Cascading Style Sheets (CSS) files, etc. However, the links included in the interactive content may cause the client device to generate a different type of request (e.g., a user initiated request) that is not blocked by advertisement blocking software or other filtering software. For example, when a user initiated request is to retrieve a link located on a blocked interactive content domain, the blocking software may allow (e.g., not block) the user initiated request for the interactive content from the blocked interactive content domain because the interactive content was requested by the user. Alternatively, the links included in the interactive content may be located at a domain (e.g., a domain other than an interactive content domain) that is not blocked by the client device. For example, the links included in the interactive content may be located at the media server whose internet domain is not on the blocked domain list of the advertisement blocking software.

BRIEF DESCRIPTION OF THE DRAWINGS

FIG. 5 is a diagram of another illustrative embodiment of displaying second interactive content concurrently with a media stream;

DETAILED DESCRIPTION

Figure 1:
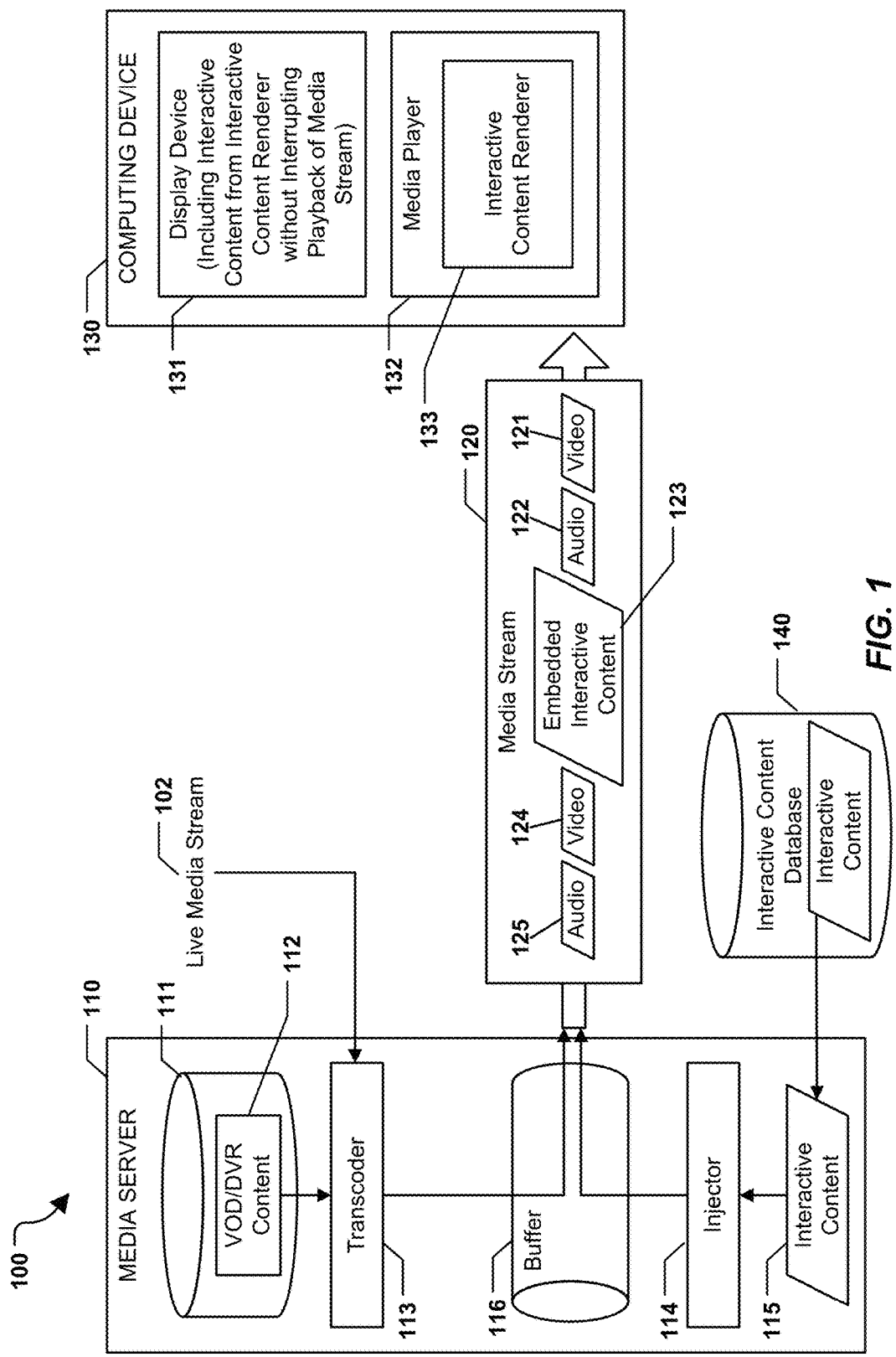
FIG. 1 is a diagram of an illustrative embodiment of a system that is operable to support communication of interactive content embedded in a media stream to a computing device.

FIG. 1 illustrates a particular embodiment of a system 100 that includes a media server 110 and a computing device 130. The media server 110 may receive data (e.g., a live media stream 102 from a capture device, such as a camera, or from another media server or computing device). The media server 110 may also send data (e.g., an illustrative media stream 120) to the computing device 130 and/or another device. In a particular embodiment, the media server 110 communicates via networks, such as a local area network (LAN) or the Internet, using a wired or wireless network connection. It should be noted that although certain operations may be described herein as being performed by the media server 110 or the computing device 130, in alternative embodiments such operations may be performed by one or more other types of devices, such as desktop computers, laptop computers, mobile phones/smartphones, tablet computers, portable computing devices, game consoles, set-top boxes, televisions, cloud servers, etc. Moreover, operations described as being performed by one device may alternatively be performed by another device.

The media server 110 may include a data storage device (s) 111, which may include non-volatile storage devices (e.g., disk-based storage device(s)), cache storage devices (e.g., static random-access memory (SRAM)), or a combination of both. The data storage device(s) 111 may store content 112 (e.g., video on demand (VOD) and/or digital video recorder (DVR)) content.

The media server 110 may also include a transcoder 113 configured to transcode the live media stream 102 and/or the content 112. To illustrate, the transcoder 113 may generate multiple versions of the live media stream 102 and/or the content 112 for communication to player devices, such as the computing device 130. In the example of FIG. 1, the transcoder 113 generates audio/video data 121, 122, 124, 125 for transmission as part of the media stream 120. Each of the audio/video data 121, 122, 124, 125 may correspond to one or more data packets formatted in accordance with a media streaming protocol, as further described with reference to FIG. 11.

In a particular embodiment, to facilitate the use of adaptive bitrate (ABR) streaming, the transcoder 113 may generate multiple ABR renditions of the live media stream 102 and/or the content 112. Each ABR rendition may have a distinct bitrate (e.g., video bitrate and/or audio bitrate). ABR renditions may also differ from each other with respect to other audio and video quality parameters, such as frame size, frame rate, video coder/decoder (CODEC), audio CODEC, number of audio channels, etc. Thus, the transcoder 113 may perform bitrate conversion, CODEC conversion, frame size conversion, etc. The media server 110 may provide one or more of the ABR renditions generated by the transcoder 113 to other devices, such as the computing device 130. ABR streaming is further described with reference to FIG. 11.

The media server 110 further includes an injector 114. The injector 114 is configured to receive (or retrieve) interactive content 115 and to inject (e.g., insert) the interactive content 115 into the media stream 120 (e.g., into a data channel of the media stream 120 or streaming session) to generate a combined media stream. The injector 114 may packetize the interactive content 115. For example, the injector 114 may segment data of the interactive content 115 into portions for insertion into packets for transmission. As a first example, the interactive content 115 may be injected into the media stream 120 using in-line data packets, such as action message format (AMF) data packets. As a second example, the interactive content 115 may be injected into the media stream 120 using network abstraction layer (NAL) units. In a particular implementation, the NAL units (which include the interactive content 115) are injected into one or more video packets of the media stream 120. In some implementations, the injector 114 may convert the interactive content 115 from one format to another format (e.g., HTML or XML code). The interactive content 115 may be executable at a media player, such as a media player 132 of the computing device 130, without further translation or interpretation.

The media server 110 may also include a buffer 116 to store the audio/video data 121, 122, 124, 125 and the interactive content 115 prior to transmission of the audio/video data 121, 122, 124, 125 and the interactive content 115 as embedded interactive content 123 via the media stream 120. The embedded interactive content 123 may correspond to one or more data packets including or representing the interactive content 115 and formatted in accordance with a media streaming protocol, as further described with reference to FIG. 11. Further, the embedded interactive content 123 may correspond to code (e.g., HTML or XML code) that is executable to render the interactive content 115. To illustrate, if the interactive content 115 is a quiz question with three answer choices, the embedded interactive content 123 may correspond to data packets of HTML code that is executable to render the question and buttons corresponding each to the answer choices at a particular time and at a particular on-screen location during output of audio/video data that is also included in the media stream 120.

Alternatively, the interactive content 115 is transmitted to the computing device 130 via an "out of band" data track (e.g., is transmitted separately from the media stream). For example, when the computing device 130 requests the media stream 120 from the media server 110, the media server 110 provides a first uniform resource locator (URL) and a second URL to the computing device 130. The media server 110 provides the media stream 120 from (or using) the first URL and the interactive content 115 is delivered to the computing device 130 from the second URL via a timed data track. The interactive content 115 may be provided by the media server 110 or another server.

The computing device 130 may include or be coupled to a display device 131, the media player 132 (e.g., a media player software application), and an interactive content renderer 133. The media player 132 may be configured to receive the media stream 120 and initiate output of the media stream 120 (e.g., display of video at the display device 131 and output of audio at a speaker or headset/auxiliary output). The media player 132 may also be configured to detect that the embedded interactive content 123 has been received in the media stream 120, and to invoke the interactive content renderer 133 to execute the embedded interactive content 123. The embedded interactive content 123 may include executable code (e.g., HTML or XML code) that the interactive content renderer 133 executes to render the interactive content 115. The interactive content 115 may include games, puzzles, quiz questions, advertisements, an HTML based application, or a combination thereof. Additionally or alternatively, the interactive content 115 may include text, links to graphics, links to Cascading Style Sheets (CS S) files, links to media, script language (e.g., JavaScript, ActionScript, etc.), or a combination thereof.

Other computing devices (not shown in FIG. 1) may similarly include media players that can render interactive content. Such devices may receive the same media stream 120 as the computing device 130 or a different media stream (e.g., in terms of bitrate, CODECs used, an amount or a type of interactive content included in the media stream, etc.). It will thus be appreciated that through communication of the embedded interactive content, the system 100 of FIG. 1 enables server based dynamic insertion of interactive content into a media stream. Content providers can dynamically modify the interactive content 115 being inserted into a particular media stream without modifying the VOD/DVR content 112 or the live media stream 102. In addition, when multiple devices are receiving the media stream 120, each such device can receive different interactive content based on content provider preferences, user preferences, interactions with received interactive content, or a combination thereof.

The media server 110 may store the interactive content 115 or receive the interactive content 115 from an interactive content database 140. In some implementations, the media server 110 retrieves the interactive content 115 from the interactive content database 140. In such implementations, the media server 110 may generate a request for particular interactive content based on content provider preferences, content of the media stream 120, and/or user preferences, as further described with reference to FIG. 11. Additionally or alternatively, the interactive content database 140 may provide the media server 110 the interactive content 115 based on rules of the interactive content database 140.

During operation, the media server 110 may transmit the media stream 120 to the computing device 130 and to one or more other computing devices (e.g., via unicast, multicast, broadcast, etc.). The media stream 120 may include various portions. For example, a first portion of the media stream 120 may include the video data 121 and the audio data 122, a second portion of the media stream 120 may include the embedded interactive content 123, and a third portion of the media stream 120 may include the video data 124 and the audio data 125. In some implementations, the interactive content 115 may be retrieved (e.g., "pulled") from the interactive content database 140 based on content provider preferences, content of the media stream 120, user preferences, user responses to previously sent interactive content, or any combination thereof. In other implementations, the interactive content 115 may be received (e.g., "pushed") from the interactive content database 140. The injector 114 may insert the interactive content 115 into the second portion of the media stream 120 as the embedded interactive content 123. In some implementations, the interactive content 115 is sent along with the packets that include the audio/video data 121, 122, 124, 125. In such implementations, the interactive content 115 may be included in a header portion or a data portion of the packet. Additionally or alternatively, the interactive content 115 is sent in packets that do not include the audio/video data 121, 122, 124, 125.

The interactive content 115 may include placement information. Alternatively, the placement information may be included in a header of a packet containing the interactive content 115. The placement information may include information specifying when to display the interactive content 115, such as at a specific time or with a specific video frame or frames. Additionally, the interactive content 115 may include information specifying a duration (e.g., 30 seconds, until a particular input is received from a user, or both) of displaying the interactive content 115. Further, the interactive content 115 may include information indicating a position or placement of the interactive content 115 with respect to the display device 131 and/or the video content of the media stream 120.

The media player 132 may initiate playback of the video data 121 and the audio data 122. The interactive content renderer 133 may execute the embedded interactive content 123 to generate the interactive content 115 in interactive content layer without interrupting playback of the media stream 120. For example, the display device 131 may concurrently display the video data 124 with the interactive content 115.

The system 100 of FIG. 1 may thus enable dynamic server based insertion of interactive content into a media stream for on-the-fly execution and display by a media player of a client device. The display of interactive content may not be blocked by advertisement blocking software of the computing device 130 because the computing device 130 does not make a call to the interactive content database 140 to request the interactive content 115. Additionally, because the interactive content 115 is provided by the media server 110 instead of retrieved by the computing device 130, content providers and media servers have more control over the particulars of how the interactive content 115 is displayed. Furthermore, the media server 110 providing the interactive content 115 may reduce occurrences of flawed presentation of the interactive content 115 (e.g., incorrect timing, low resolution, etc.) by the computing device 130 as compared to the computing device 130 retrieving the interactive content 115.

It is noted that the techniques of the present application differ from interactive content inserted into the display of a media stream client-side because, as described above, a separate call is made to another server to request the interactive content via a different data transfer session (e.g., not via a streaming session corresponding to the media stream 120). Instead, the interactive content renderer 133 within the media player 132 (or invoked by the media player 132) renders the interactive content 115 (based on executing the embedded interactive content 123) and overlays the interactive content 115 over the media stream 120 without interrupting receipt and playback of the media stream 120.

Whereas FIG. 1 illustrates communication of the embedded interactive content 123 as part of the media stream 120, the present disclosure also provides for injecting interactive content (e.g., additional or second interactive content) into the media stream based further on user interaction (e.g., a user response) with previously injected interactive content. For example, in the system 200 of FIG. 2, the media server 110 sends embedded second interactive content 223 to the computing device 130 based on user response data 220. Additionally, the media server 110 may send interactive content based on one or more of user history, user location, device location, interactive content rules, and responses to interactive content requests by the server, etc., as described with reference to FIG. 1.

Figure 2:
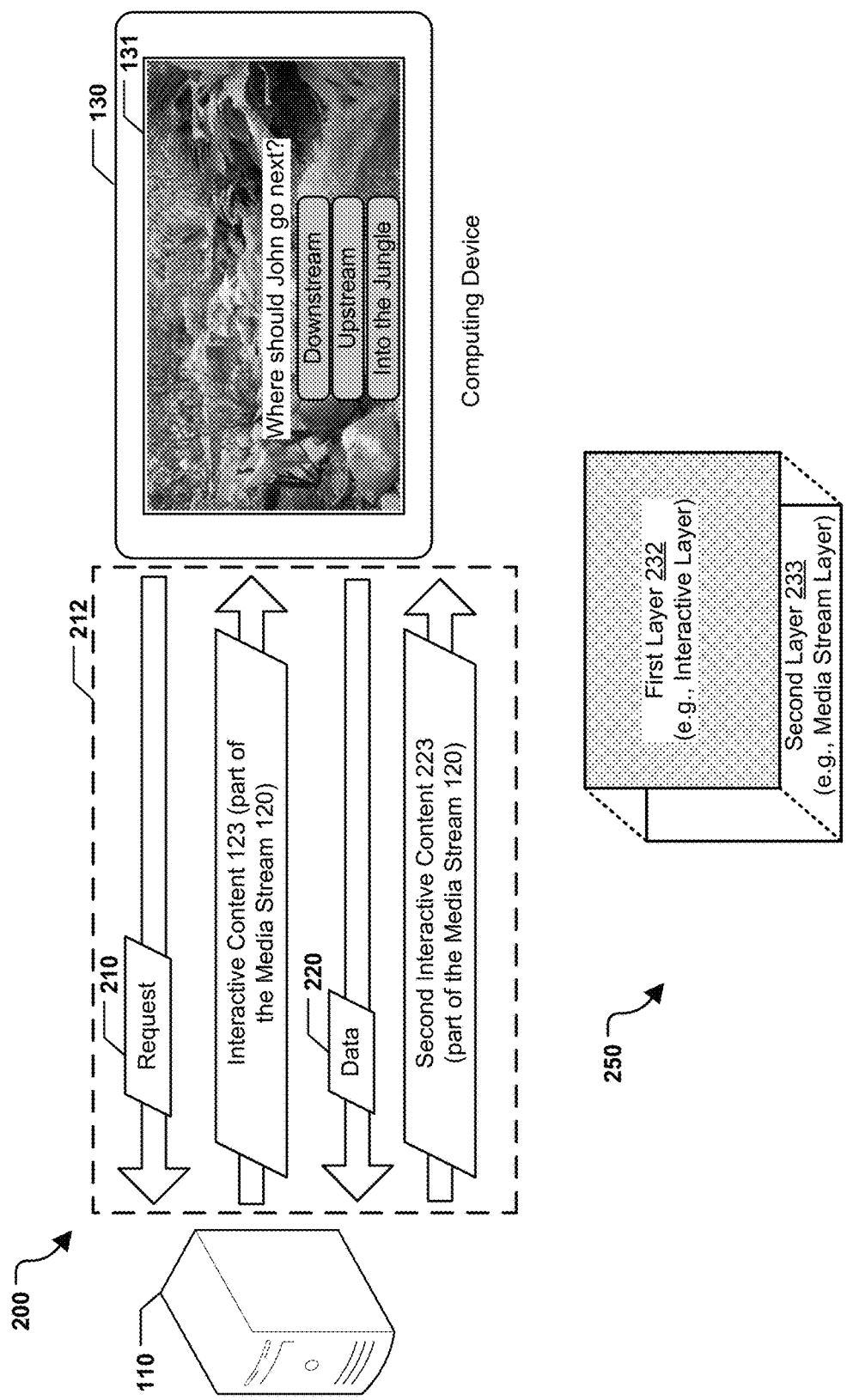
FIG. 2 is a diagram of another illustrative embodiment of a system that is operable to support communication of interactive content embedded in a media stream to a computing device.

In the particular example illustrated in FIG. 2, the media server 110 receives a request 210 for the media stream 120 from the computing device 130. The request 210 for the media stream 120 may initiate or cause a streaming session 212 to be initiated between the media server 110 and the computing device 130. After the streaming session 212 is initiated, the media server 110 transmits the media stream 120 to the computing device 130 during the streaming session 212. The computing device 130 displays the media stream 120 via the display device 131. During the streaming session 212, the media server 110 injects the interactive content 115 into the media stream 120 as the embedded interactive content 123 to generate a combined media stream. The computing device 130 concurrently displays the interactive content 115 and video content of the media stream 120. In the particular implementation illustrated in FIG. 2, the computing device 130 displays the interactive content 115 overlaid on top of the video content of the media stream 120. As illustrated in a diagram 250 depicting layers output by the display device 131, the computing device 130 renders the interactive content 115 in a first layer 232 (e.g., an interactive layer) and renders the video content in a second layer 233 (e.g., a media stream layer).

The interactive content 115 or a header of a packet that includes the interactive content 115 includes placement information. For example, executable code of the interactive content 115 includes position information of where to display the interactive content 115 on the display device 131 and in relation to the video content and size information of how large to render the interactive content 115. As illustrated in FIG. 2, the interactive content 115 is rendered in a center portion of the display device 131 from a middle portion to a bottom portion of the display device 131. The placement information may further include timing information, such as when to display the interactive content 115 and for how long. To illustrate, the timing information may indicate a start time or a start frame. The timing information may further indicate an ending timing or ending frame. Additionally or alternatively, the timing information may indicate that the interactive content 115 is to remain displayed until a particular user input is received by the computing device (e.g., such as a tap received via the display device 131). As depicted in FIG. 2, the interactive content 115 is displayed concurrently with a particular frame (e.g., a frame depicting a river running through a jungle). In a particular implementation, the interactive content 115 may be displayed for 30 seconds or until a user response is received at the computing device 130, whichever occurs first.

Additionally, the executable code of the interactive content 115 includes links to files, such as links to graphics, links to CSS files, links to media, etc., as described further with reference to FIGS. 3-8. The computing device 130 may retrieve the files indicated by the links to supplement the interactive content 115. Alternatively, at least some of such files may be included in the interactive content 115 (or in the embedded interactive content 123).

A user of the computing device 130 may interact with the interactive content 115 displayed in the first layer 232. As illustrated in FIG. 2, the display device 131 displays the interactive content 115 as including three selectable elements (e.g., "Downstream," "Upstream," and "Into the Jungle"). Responsive to receiving a user input indicating the "Downstream" element, the computing device 130 sends the data 220 to the media server 110 indicating the user selection. For example, when a user of the computing device 130 interacts with interactive content 115, the computing device 130, the interactive content 115, or both may generate data that is transmitted to the media server 110, a destination identified by the interactive content 115, or both. To illustrate, in the example of FIG. 2, after the user selects the depicted "Downstream," "Upstream," or "Into the Jungle" element, the computing device 130 may send the media server 110 the data 220 indicating the user's selection.

The media server 110 is configured to provide the second interactive content 223 to the computing device 130 based on the data 220. For example, the media server 110 injects the second interactive content 223 into the media stream 120 during the streaming session 212. In some implementations, the second interactive content 223 is stored at a database of the media server 110. In other implementations, the media server 110 requests the second interactive content 223 from an interactive content domain based on the data 220. In a particular implementation, the media server 110 may also retrieve particular video and audio content of the media stream based on the data 220. For example, the media stream 120 may include multiple selectable video and audio content (e.g., to determine where John should go next in a VOD feed with multiple options corresponding to "Downstream," "Upstream," and "Into the Jungle") and the media stream 120 may retrieve particular video and audio content corresponding to the user selection of John going Downstream. The media server 110 provides the particular video and audio content of the media stream 120 corresponding to the user selection of John going Downstream to the computing device 130. As another example, when the media stream 120 corresponds to a live media stream, the media server 110 may forward the data 220 to a source of the media stream 120 such that the source of the media stream 120 may create a portion of the media stream 120 based on the data 220 (e.g., based on the data 220, an actor playing John may be directed to go Downstream during a second portion of the media stream 120). Thus, the media server 110 may enable dynamic media stream construction based on user responses to interactive content.

In a particular implementation, the media server 110 may aggregate the data 220 with data received from other devices (e.g., to determine where John should go next in a live video feed or a VOD feed with multiple options). In such an implementation, the media server 110 injects the second interactive content 223 into the media stream 120 during the streaming session 212 based on the aggregated data (e.g., response data from multiple users). Additionally or alternatively, the media server 110 selects video content to send to the computing device 130 via the streaming session 212 based on the aggregated data (e.g., response data from multiple users).

In another particular implementation, the media server 110 may aggregate the data 220 with the data received from other devices to determine content of a second media stream (e.g., to determine where John should go in next week's episode). In such an implementation, the media server 110 and the computing device 130 may establish a second streaming session and the media server 110 sends a second media stream including the second interactive content 223 to the computing device 130. Thus, the media server 110 may enable dynamic media stream generation based on user responses to interactive content.

In another example of operation, interactive content can be sent to the computing device 130 via a second data transfer session (e.g., separate from the streaming session 212 that corresponds to the media stream 120). For example, the media server 110 may conduct the second data transfer session with the computing device 130 without interrupting the streaming session 212 and may send the interactive content 115 to the computing device 130 via the second data transfer session without the interactive content 115 being part of the media stream 120 and the streaming session 212. To illustrate, the media server 110 may use a first URL to deliver the media stream 120 (e.g., the media stream 120 is located at the first URL and sent from the first URL) to the computing device 130 and may use a second URL to deliver the interactive content 115 to the computing device 130. Thus, a media server may provide interactive content to a client device within or separately from a streaming session that provides a media stream. Alternatively, a separate server (e.g. a second server separate from the media server 110) may send the interactive content 115 to the computing device 130. To illustrate, the media server 110 may direct the computing device 130 to the separate server to retrieve the interactive content 115 and the separate server may be distinct from an advertising server.

In other examples of operation, the embedded interactive content 123 may be sent to the computing device 130 in response to a schedule or a timer (e.g., for periodic presentation of interactive content), in response to user input at the media server 110 (e.g., when a content vendor or an interactive content vendor elects to provide interactive content), etc. The systems of FIGS. 1-2 thus enable providing interactive content to computing devices having different device types, operating systems, architectures, etc. in various scenarios dynamically from a media server (or from multiple media servers) without having to have a client device retrieve the interactive content (e.g., make a request or call to an interactive content database and/or open another data transfer session).

Figure 3:
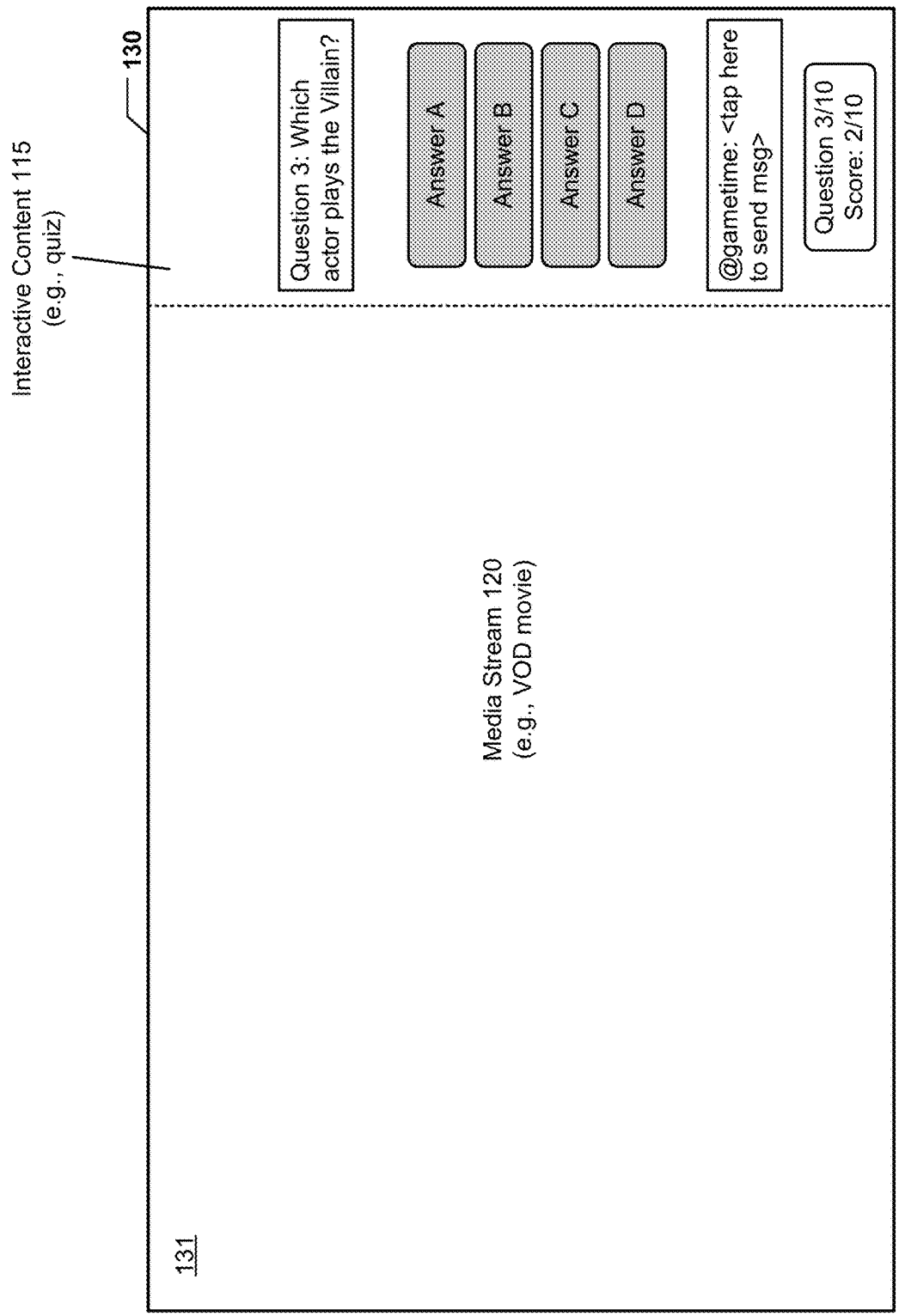
FIG. 3 is a diagram of an illustrative embodiment of displaying interactive content concurrently with a media stream.
Figure 4:
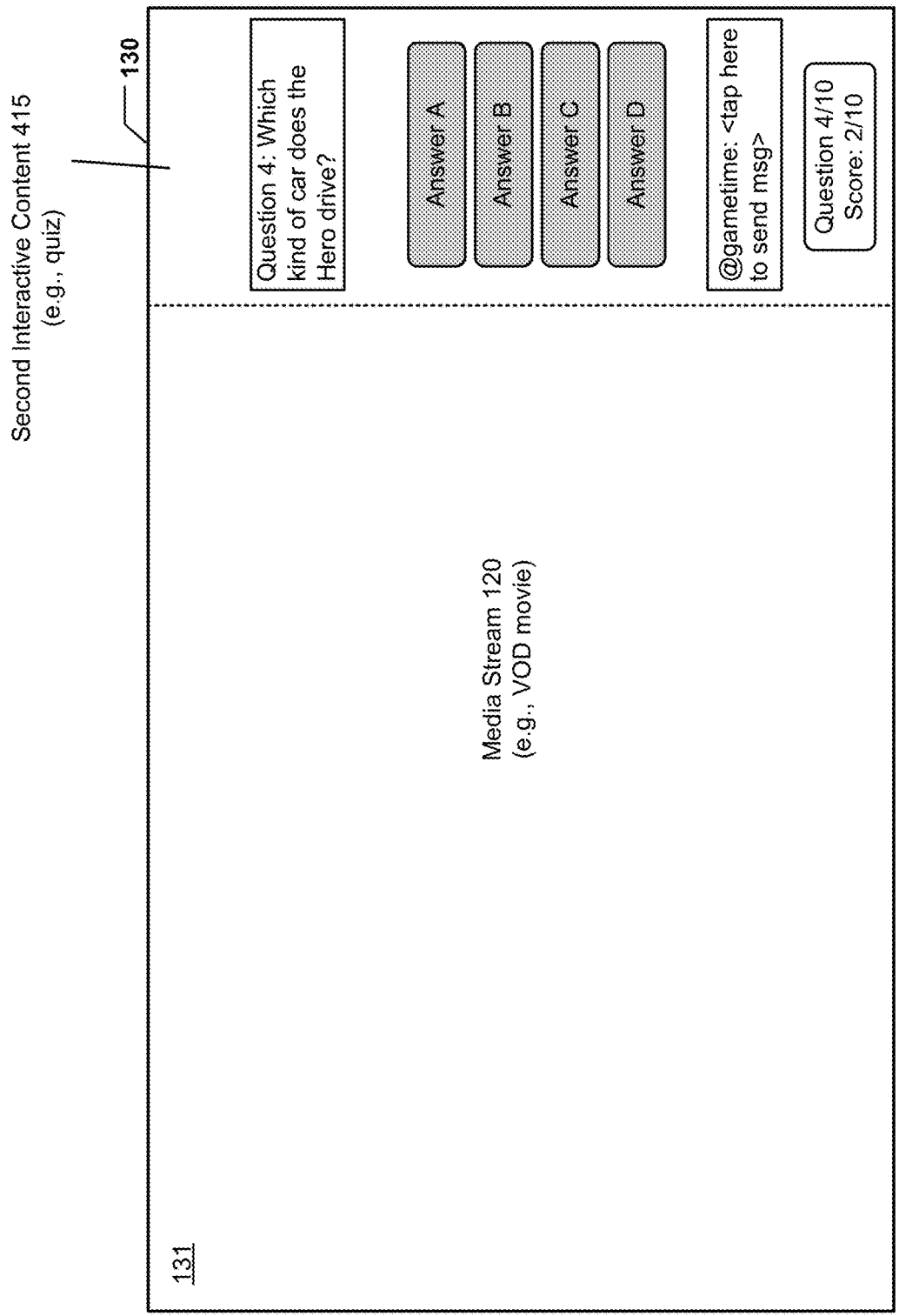
FIG. 4 is a diagram of an illustrative embodiment of displaying second interactive content concurrently with a media stream.

FIGS. 3-8 illustrate various examples of displaying first interactive content and second interactive content received from a media server based on user interaction with the first interactive content. For example, the computing device 130 may receive the interactive content 115 and the second interactive content from the media server 110 based on user responses (e.g., the data 220) via streaming session. FIGS. 3-5 illustrate examples where the interactive content 115 corresponds to an interactive quiz. FIGS. 4 and 5 illustrate different second interactive content provided from the media server 110 to the computing device 130 based on user interaction (e.g., different responses) with the interactive quiz.

Referring to FIG. 3, an example of interactive content that may be executed and rendered by a media player (e.g., interactive content renderer 133 of the media player 132) without interrupting playback of a media stream is depicted. As illustrated in FIG. 3, the display device 131 of the computing device 130 displays the interactive content 115, which corresponds to a third question of a ten question quiz. As illustrated in FIG. 3, the interactive content 115 is overlaid on top of the video content of the media stream 120 (e.g., a VOD movie). In the particular implementation illustrated in FIG. 3, the interactive content 115 is displayed over a right-hand side portion of the VOD movie, partially obscuring the VOD movie. The placement information of the interactive content 115 may indicate that the third question is to be displayed at a certain time of the VOD movie or at a specific frame of the VOD movie. The interactive content 115 (or a portion thereof) may be removed from the display device 131 after 10 seconds or after a user input is received. In other implementations, the interactive content 115 is displayed side-by-side with the VOD movie and the VOD movie may be resized to accommodate (e.g., make space for) the interactive content 115. After a user input is received, such as via a touchscreen of the display device 131, the computing device 130 sends user response data (e.g., the data 220) to the media server 110.

FIG. 4 illustrates the display device 131 displaying second interactive content 415 (e.g., a fourth question of the ten question quiz) responsive to selection of an incorrect answer (e.g., Answer A, B, or D) of FIG. 3. In the implementation illustrated in FIG. 4, responsive to user selection of the incorrect answer, the computing device 130 receives second interactive content 415 corresponding to a different (e.g., a non-related) question than the third question illustrated in FIG. 3 from the media server 110 via the streaming session. To illustrate, the fourth question is related to a hero of the VOD movie while the third question was related to the villain of the VOD movie. Conversely, FIG. 5 illustrates the display device 131 displaying second interactive content 515 (e.g., a different fourth question than illustrated in FIG. 4) responsive to selection of a correct answer (e.g., Answer C). In the implementation illustrated in FIG. 5, responsive to user selection of the correct answer, the computing device 130 receives the second interactive content 515 related or follow-up question to the third question illustrated in FIG. 3 from the media server 110 via the streaming session. To illustrate, when the user answers the third question correctly, the fourth question is also related to the villain of the VOD movie.

Additionally or alternatively, other types of interactive content may be provided to the computing device 130 based on the user selection. For example, interactive advertisements may be provided to the computing device 130 and displayed along with the media stream 120, the interactive quiz, or both. As another example, during a talent show or a reality competition, the interactive content 115 may include a list of contestants of the talent show or the reality competition and the user response may be used to determine which contestant(s) will be voted off/kept on the talent show or the reality competition.

Figure 6:
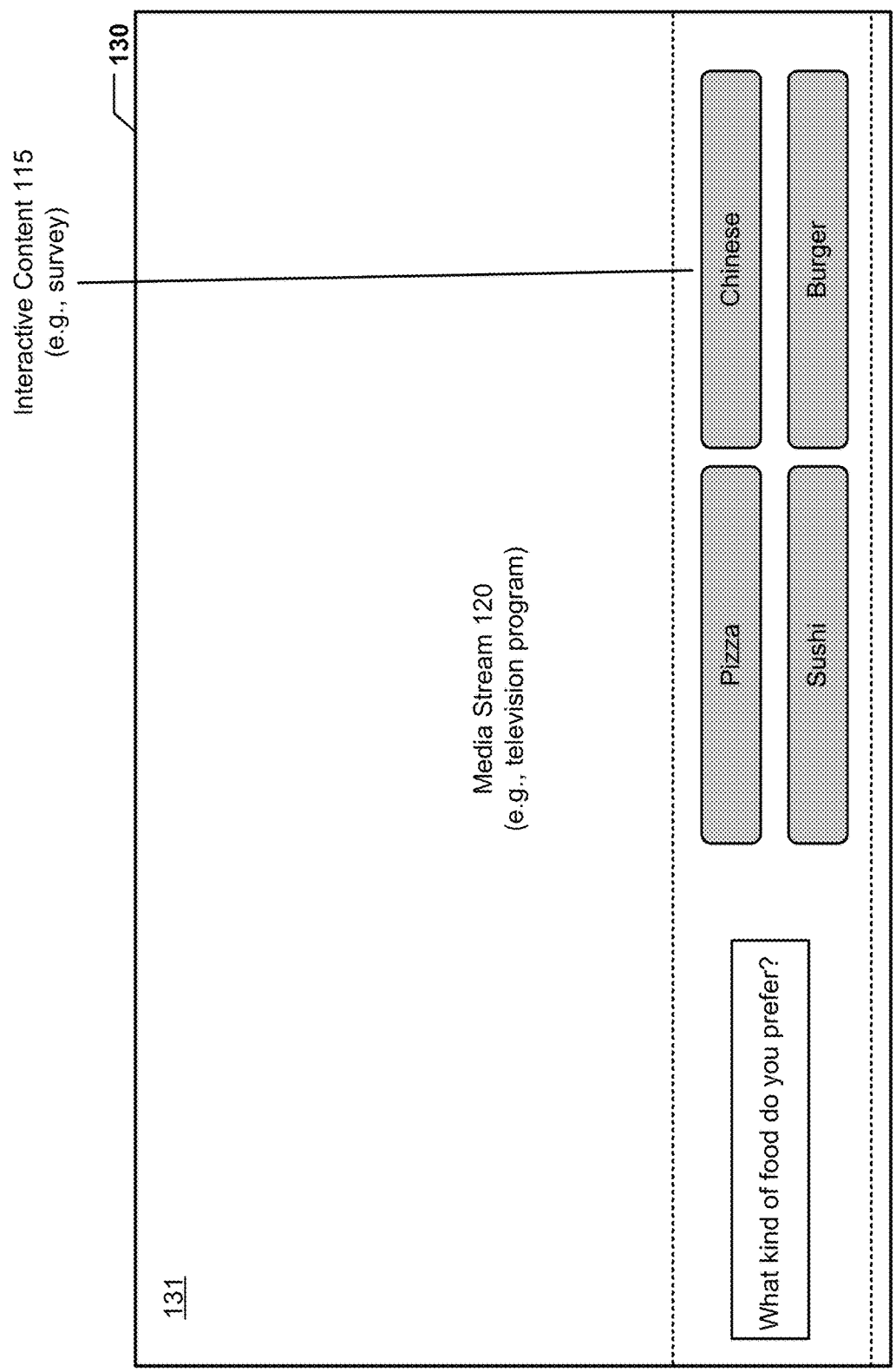
FIG. 6 is a diagram of another illustrative embodiment of displaying interactive content concurrently with a media stream.
Figure 7:
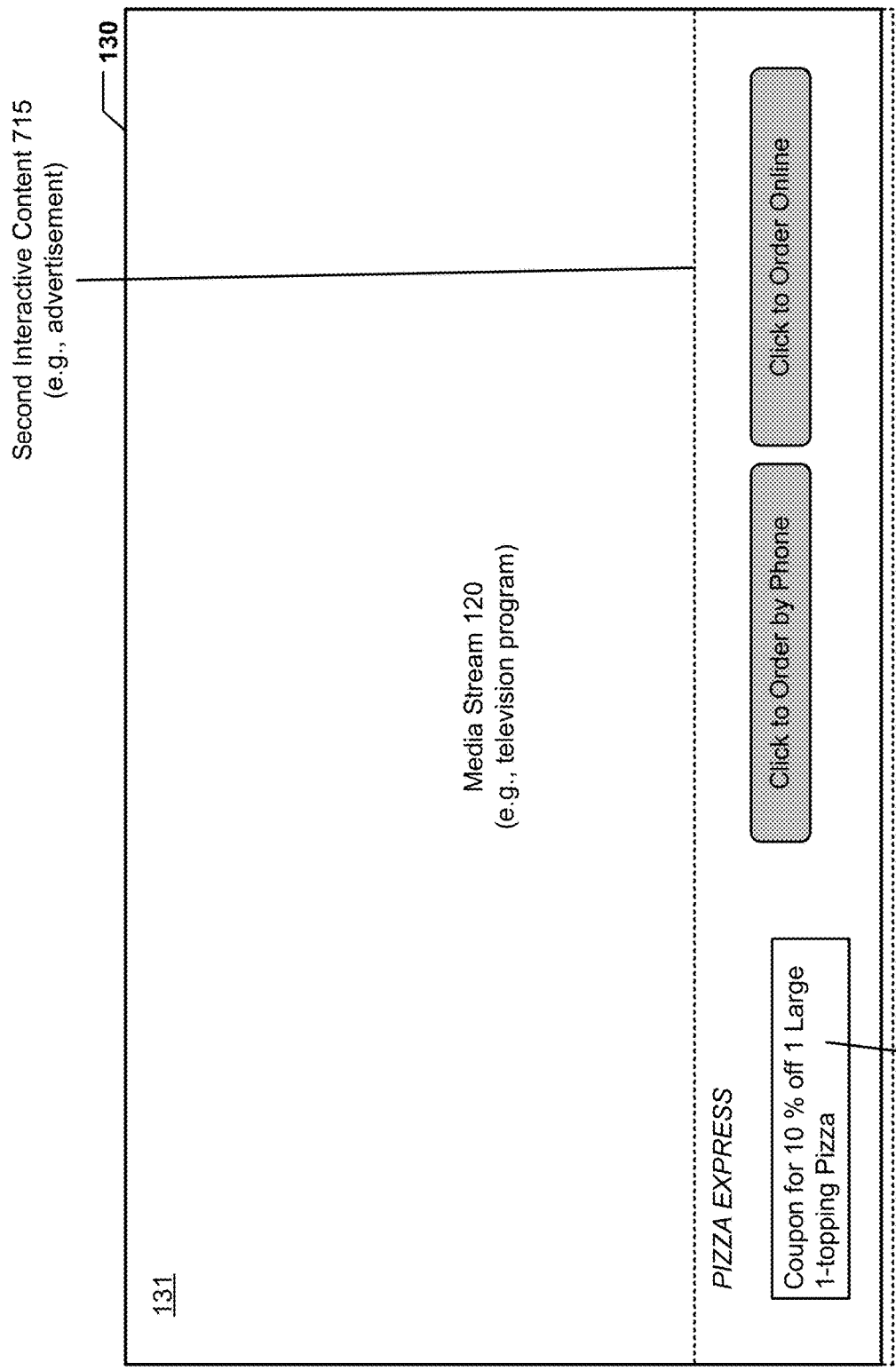
FIG. 7 is a diagram of another illustrative embodiment of displaying second interactive content concurrently with a media stream.

FIGS. 6 and 7 illustrate examples where the interactive content 115 corresponds to a survey. Referring to FIG. 6, another example of interactive content that may be executed and rendered by a media player without interrupting playback of a media stream is depicted. In FIG. 6, the display device 131 displays the media stream 120 (e.g., a television program) and a survey (e.g., the interactive content 115). The interactive content 115 includes four selectable elements (e.g., Answers A-D). A user of the computing device 130 may input a selection using the selectable elements and the computing device 130 sends the selection to the media server 110. The media server 110 selects and injects second interactive content based on the user interaction with the interactive quiz into the media stream 120 (e.g., a selection of a particular element of the selectable elements).

FIG. 7 illustrates second interactive content 715 displayed by the display device 131. In FIG. 7, the display device 131 displays an advertisement (e.g., a 10 percent off coupon for Pizza Express) and two selectable elements for ordering pizza based on user interaction with the interactive content 115 displayed in FIG. 6, such as user selection of the "Pizza" element (or icon) in FIG. 6. The second interactive content 715 may include a link to a web address and may cause the web address to be displayed at the computing device responsive to user interaction with the interactive content. Additionally, the interactive content may include a phone number and may cause a phone application to be accessed at the computing device 130.

Figure 8:
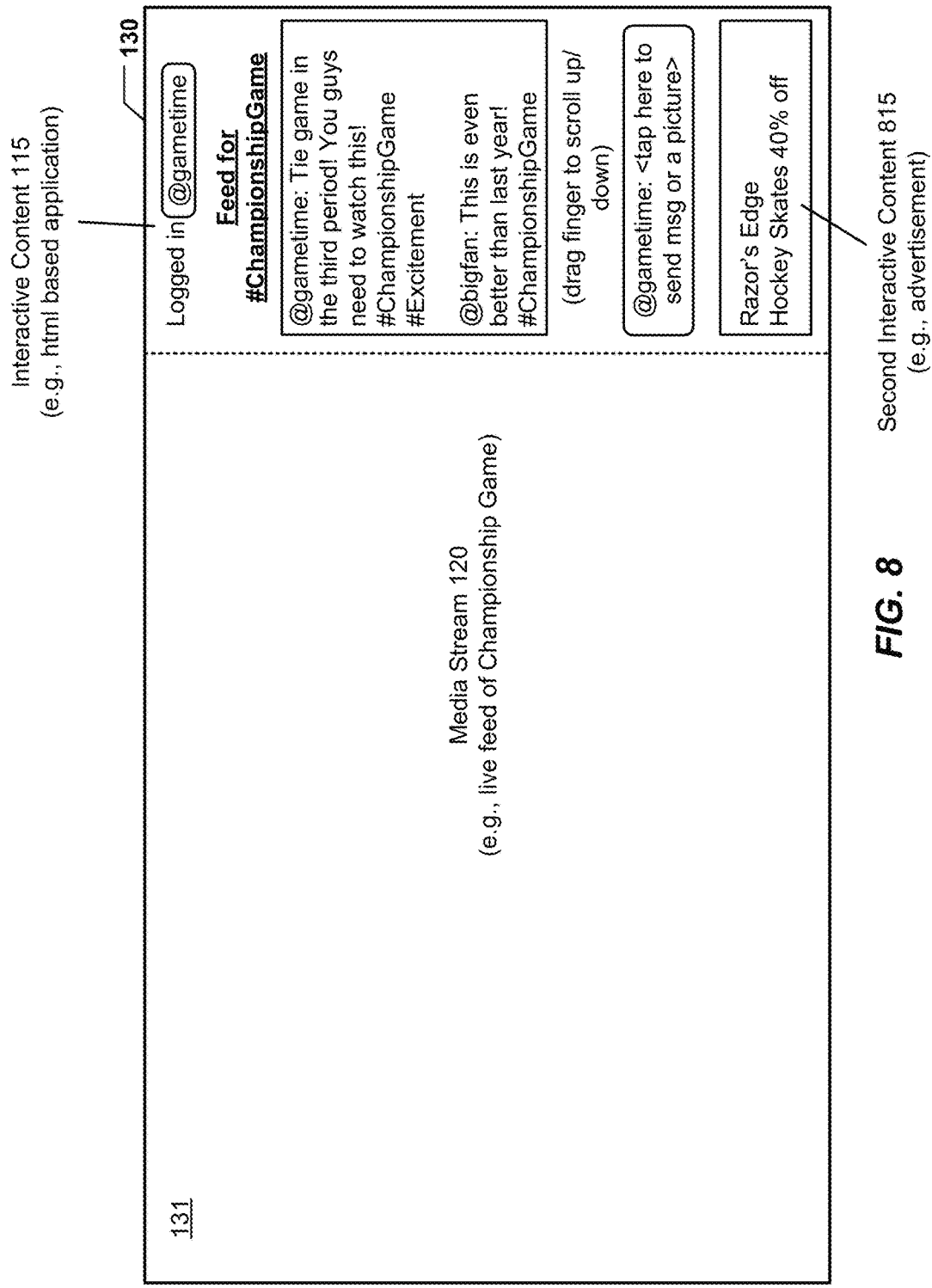
FIG. 8 is a diagram of yet another illustrative embodiment of displaying interactive content concurrently with a media stream.

FIG. 8 illustrates another example of interactive content that may be executed and rendered by a media player without interrupting playback of a media stream. In FIG. 8, the display device 131 displays an HTML-based social network client application without interrupting playback of a media stream (e.g., a live feed of a Championship Game). The HTML-based social network client application enables a user to read social networking messages, post social networking messages, and post a picture (e.g., a selfie) while watching the live feed (e.g., a live media stream) of Championship Game. The media server 110 may receive the interactive content (or a portion thereof) through communication with a social network server (e.g., via an application programming interface (API)) that corresponds to the social network client application. The media server 110 may also relay received data (e.g., social network messages) from the computing device 130 to the social network server.

In FIG. 8, during a streaming session corresponding to the Championship Game, the computing device 130 receives the interactive content 115 from the media server 110 corresponding to the HTML-based application and a first message. The computing device 130 may render the HTML-based application and the first message (e.g., a message from @bigfan). The computing device 130 may send data (e.g., the data 220) to the media server 110 corresponding to a second message (e.g., a message from @gametime). Based on the second message (e.g., content of the second message related to hockey based on the string "third period"), the media server 110 injects second interactive content 815 into the media stream 120. The computing device 130 displays the second interactive content 815 (e.g., an advertisement for hockey skates). The second interactive content 815 may include a link to a web address and may cause the web address to be displayed at the computing device 130 responsive to user interaction with the second interactive content 815.

Thus, the present disclosure may enable a media server to dynamically provide interactive content to a client device for concurrent display with a media stream via a combined media stream and single streaming session. Additionally, the interactive content may be dynamically selected and injected based on user interaction with the interactive content of the combined media stream. It should be noted that the interactive content examples described and illustrated herein are for example only, and are not to be considered limiting. The systems and methods of the present disclosure may be combined and/or used with other types of interactive content.

Figure 9:
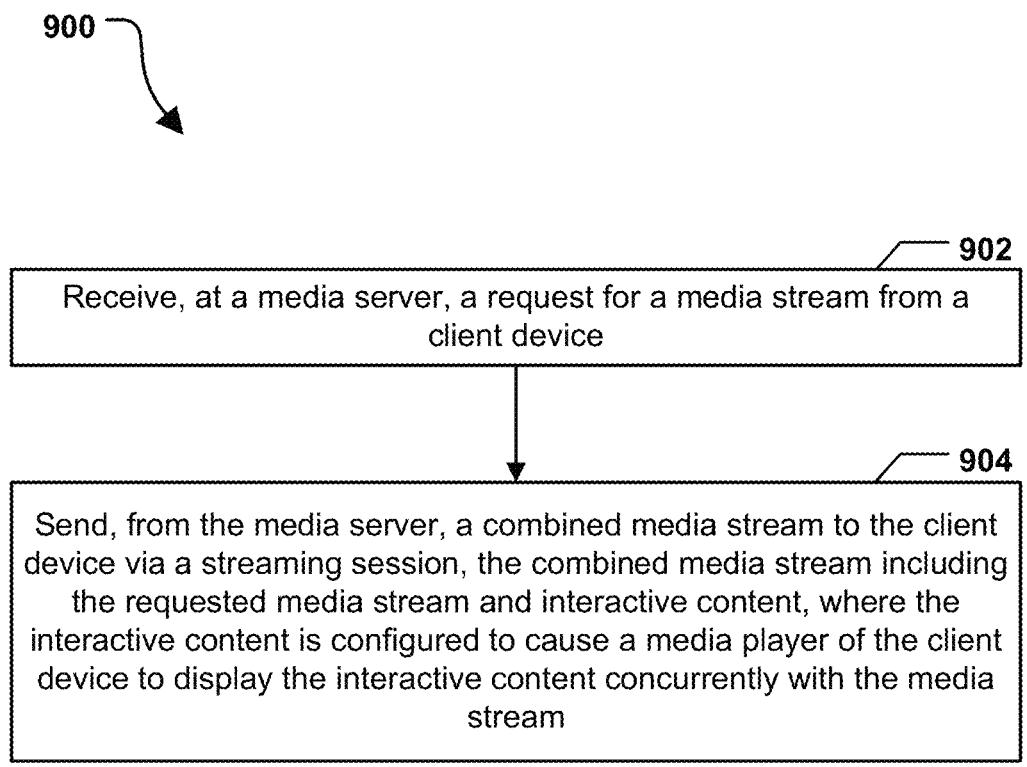
FIG. 9 is a flowchart of an illustrative embodiment of a method of a media server providing a combined media stream including interactive content to client device.

FIG. 9 is a flowchart to illustrate a particular embodiment of a method 900 of operation at a computing device. In an illustrative embodiment, the method 900 may be performed by a server, such as the media server 110 of FIGS. 1 and 2.

The method 900 includes receiving, at a media server, a request for a media stream from a client device, at 902. For example, in FIG. 1, the media server 110 may receive a request indicating a particular user requested/selected media stream from the computing device 130. The media server 110 conducts a streaming session with the computing device 130 and begins to send the media stream 120 (e.g., video and audio packets) to the computing device 130 during the streaming session. In particular embodiment, initiating, and conducting a streaming session includes forming a connection between an output port of the media server 110 and an input port of the computing device 130, allocating a network path between the media server 110 and the computing device 130, performing other session setup operations, etc.

The method 900 also includes sending, from the media server, a combined media stream to the client device via a streaming session, at 904. The combined media stream includes the requested media stream and interactive content, and the interactive content is configured to cause a media player of the client device to display the interactive content concurrently with the media stream. For example, the media server 110 sends the embedded interactive content 123 of the media stream 120 to the computing device 130 via the streaming session. The interactive content 115 is displayed at the computing device 130 concurrently with the video and audio content of the media stream 120. In a particular implementation, a second portion of the media stream 120 includes the embedded interactive content 123.

In some examples, the media server 110 may retrieve the interactive content 115 based on the request for the media stream 120, such as based on user identifying information, user history information, client device information, location information, etc., based on the selected media stream 120 (e.g., the content of the media stream 120), or a combination thereof. Alternatively, the media server 110 may request the interactive content 115 from the interactive content database 140 based on the request for the media stream 120 (e.g., information included in or with the request), based on the selected media stream 120 (e.g., the content of the media stream 120), or a combination thereof. In a particular implementation, the media server 110 converts the interactive content 115 received from the interactive content database 140 into executable code for insertion into the media stream 120.

Thus, in some scenarios, the media server 110 may function as an interactive content distribution server, and a content vendor or an interactive content vendor may generate the interactive content 115 elsewhere prior to providing the interactive content 115 to the media server 110 for distribution to customers.

In some implementations, the streaming session complies with a hypertext transfer protocol (HTTP) Live Streaming (HLS) protocol, an HTTP Dynamic Streaming (HDS) protocol, a Dynamic Adaptive Streaming over HTTP (DASH) streaming protocol, a WOWZ protocol, or a real time messaging protocol (RTMP). The WOWZ protocol may be a TCP-based messaging protocol used for inter-device communication.

In some implementations, the interactive content is included in a data channel of the streaming session. In other implementations, the interactive content is included in a side channel of the streaming session. In some implementations, the interactive content is sent in HTML format or XML format. In some implementations, the interactive content includes placement information. In a particular implementation, the interactive content (or the placement information thereof) indicates a start time to display the interactive content, and the interactive content includes at least one of a duration or an end time. In other implementations, the interactive content includes a start frame. The interactive content may indicate an end frame or may indicate that the interactive content is to remain displayed until a user input is received. In some implementations when an ending frame, an ending time, or a duration is indicated, the interactive content may be removed from the display responsive to receiving a user input prior to the displaying the ending frame or reaching the ending time or the duration.

In some implementations, the interactive content includes text, links to graphics, links to CSS files, links to media, or a combination thereof. In some implementations, the interactive content includes games, puzzles, quiz questions, advertisements, an HTML based application, or a combination thereof.

In some implementations, the method 900 further includes selecting the interactive content based on content provider preferences, user preferences, interactions with previously received interactive content, or a combination thereof, as described with reference to FIGS. 1 and 2.

In some implementations, the method 900 further includes receiving a user selection corresponding to the interactive content and providing, via the streaming session, second interactive content to the client device based on the user selection, as described with reference to FIGS. 2-8.

Figure 10:
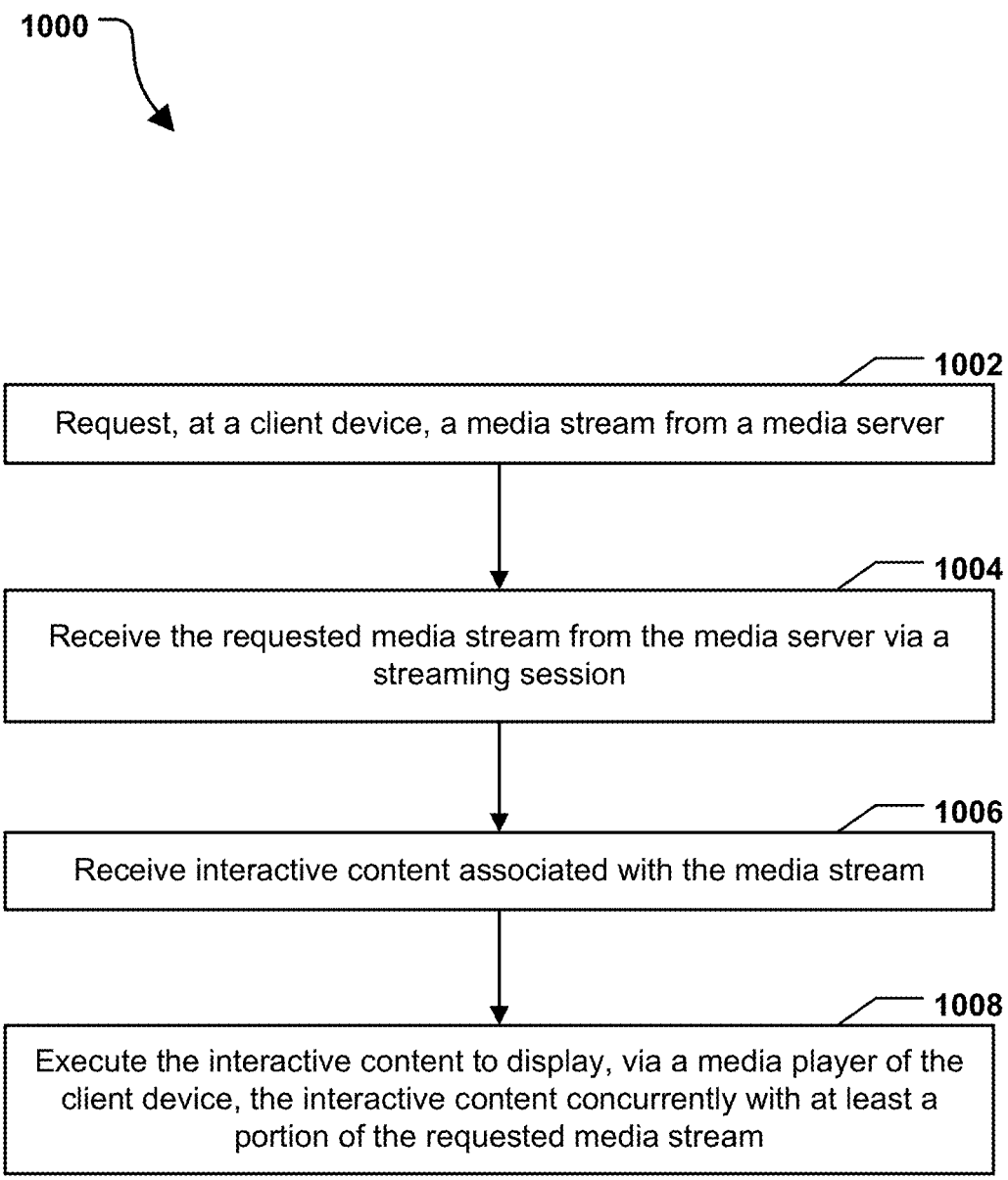
FIG. 10 is a flowchart of an illustrative embodiment of a method of displaying interactive content received in a combined media stream via a streaming session.

FIG. 10 is a flowchart to illustrate a particular embodiment of a method 1000 of operation at a device. In an illustrative embodiment, the method 1000 may be performed by a playback device, such as the computing device 130 of FIGS. 1 and 2.

The method 1000 includes requesting, at a client device, a media stream from a media server, at 1002. For example, in FIG. 1, the computing device 130 may request the media stream 120. The media server 110 may conduct a streaming session with the computing device 130 and send the media stream 120 to the computing device 130 during the streaming session. In a particular embodiment, initiating and conducting a streaming session includes forming a connection between an output port of the media server 110 and an input port of the computing device 130, allocating a network path between the media server 110 and the computing device 130, performing other session setup operations, etc.

The method 1000 also includes receiving the requested media stream from the media server via a streaming session, at 1004. For example, in FIG. 1, during the streaming session (e.g., playback of the video data 121 and the audio data 122 of the media stream 120), the computing device 130 may receive the embedded interactive content 123 of the media stream 120. In some implementations, the interactive content is received via a data channel of the media stream. In some implementations, the interactive content includes HTML code or XML code. In some implementations, the interactive content includes text, a graphic link, a media link, or a CSS file link. In such implementations, the method 1000 further includes retrieving one or more of the text, the graphic link, the media link, or the CSS file link.

The method 1000 further includes receiving interactive content associated with the media stream, at 1006. For example, in FIG. 1, during the streaming session (e.g., playback of the video data 121 and the audio data 122 of the media stream 120), the computing device 130 may receive the embedded interactive content 123 of the media stream 120. In another example, the computing device 130 receives the interactive content 115 associated with the media stream 120 from the media server 110 via a second streaming session. In another example, the computing device 130 receives the interactive content 115 from a second server (distinct from the media server) via a second streaming session.

The method 1000 further includes executing the interactive content to display, via a media player of the client device, the interactive content concurrently with at least a portion of the requested media stream, at 1008. For example, in FIG. 1, the interactive content renderer 133 of the media player 132 renders the interactive content 115 for display via the display device 131 along with video content (e.g., the video data 121, 124, or both) of the media stream 120. The interactive content 115 is displayed via the media player 132 (e.g., within a portion of the display device 131 corresponding to the media player 132) and concurrently with a portion of the media stream 120.

In some implementations, the interactive content is displayed in a first layer and the portion of the media stream is displayed in a second layer (e.g., the interactive content is overlaid on video content of the portion of the media stream). In other implementations, the interactive content and the portion of the media stream are displayed side-by-side.

In some implementations, the method 1000 further includes executing the HTML code or the XML code of the interactive content to render the interactive content in the first layer. The first layer overlies a second layer including the portion of the media stream (e.g., the video content of the portion of the media stream).

In some implementations, the method 1000 includes, responsive to receiving user input corresponding to the interactive content, sending data indicating the user input to the media server. The method 1000 also includes receiving, via the streaming session, second interactive content based on the data indicating the user input. In some implementations, the method 1000 further includes displaying at least a second portion of the requested media stream and the second interactive content concurrently.

In some implementations, the media stream comprises a combined media stream that includes the requested media stream and the interactive content. In other implementations, the interactive content is received from a second server distinct from the media server.

In some implementations, the method 1000 further includes receiving a uniform resource locator (URL) from the media server. The URL indicates a location of the interactive content on the media server, and the interactive content is received from the media server via a second streaming session.

In some implementations, the method 900 or 1000 is performed by a processor coupled to a memory that stores instructions that, when executed by the processor, cause the processor to perform various operations. For example, with respect to the method 900, the instructions, when executed by the processor, cause the processor to perform the operations of receiving a request for a media stream from a client device and initiating sending a combined media stream to the client device via a streaming session. The combined media stream includes the requested media stream and interactive content and the interactive content is configured to cause a media player of the client device to display the interactive content concurrently with the media stream.

In some implementations, the operations also include selecting the interactive content based on content provider preferences, user preferences, interactions with received interactive content, or a combination thereof. Additionally or alternatively, the operations further include receiving a user selection corresponding to the interactive content and providing, via the streaming session, second interactive content to the client device based on the user selection.

Figure 11:
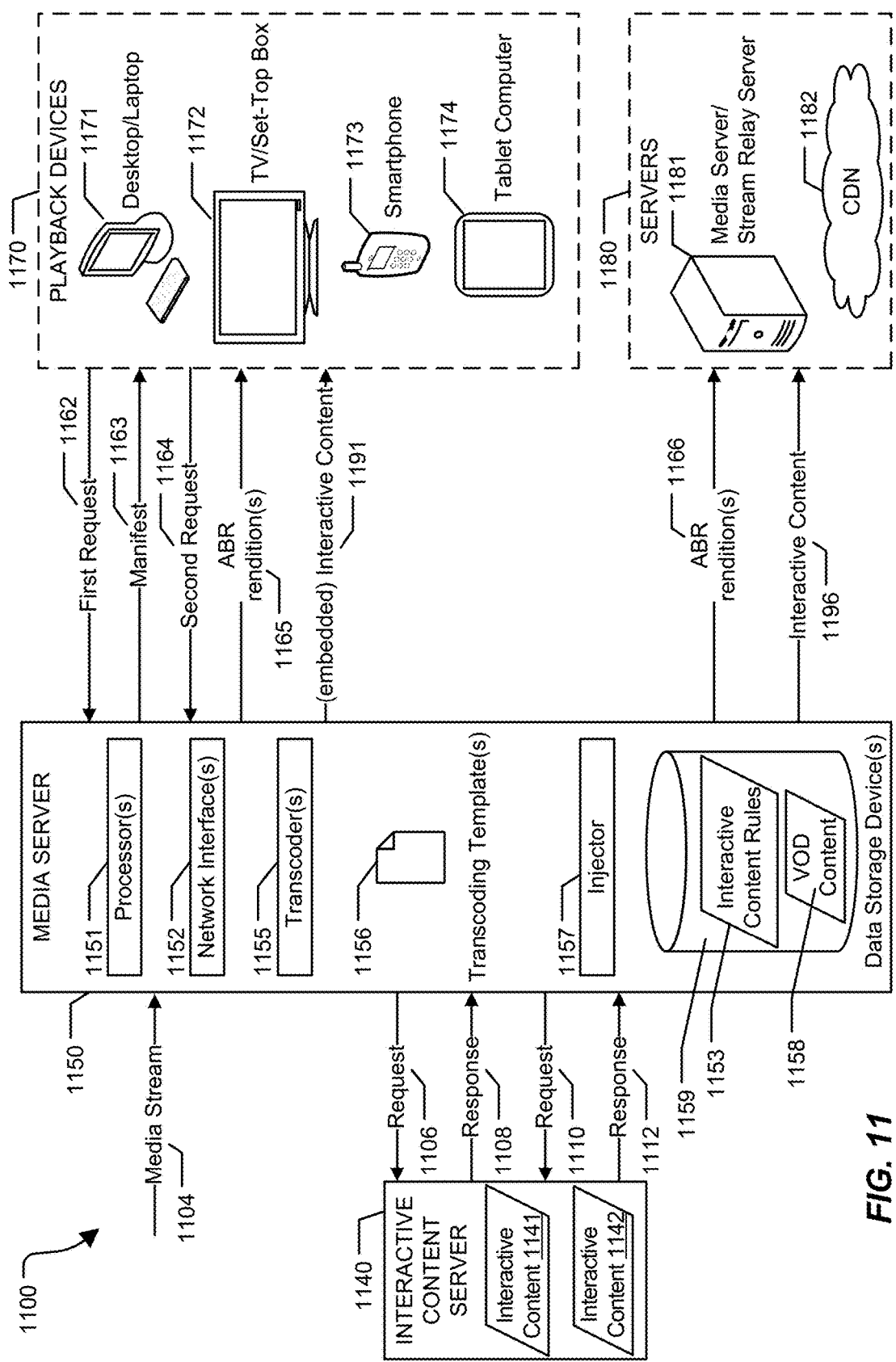
FIG. 11 is a diagram of another illustrative embodiment of a system that is operable to support communication of interactive content embedded in a media stream to a computing device.

FIG. 11 illustrates another particular embodiment of a system 1100 in accordance with the present disclosure. The system 1100 includes a media server 1150, which may correspond to the media server 110 of FIGS. 1-2. The media server 1150 may include one or more processor(s) 1151 and various components that are executable by the processor(s) 1151. The media server 1150 may include software application(s) that perform media serving or processing, hardware systems (e.g., servers) that support or perform media serving and processing, or any combination thereof. Thus, various operations described with reference to the media server 1150, or components thereof, may be implemented using hardware, software (e.g., instructions executable by the processor(s) 1151), or any combination thereof.

The media server 1150 may also include one or more network interface(s) 1152. For example, the network interface(s) 1152 may include input interface(s) and output interface(s) that are configured to receive data and to send data, respectively. In a particular embodiment, the network interface(s) 1152 may be wired and/or wireless interfaces that enable the media server 1150 to communicate data via a network, such as the Internet. For example, the network interface(s) 1152 may include an Ethernet interface, a wireless interface compatible with an Institute of Electrical and Electronics Engineers (IEEE) 802.11 (e.g., Wi-Fi) protocol, or other wired or wireless interfaces. The network interface(s) 1152 is configured to receive a request (e.g., a first request 1162) from a particular playback device of playback devices 1170, request (e.g., via a request 1106) the interactive content 1141 from an interactive content server 1140, and send a combined media stream (e.g., ABR renditions 1165 and embedded interactive content 1191) to the particular playback device.

Thus, the media server 1150 may be configured to receive and send data from various other devices (e.g., via a network, such as a local area network (LAN) or the Internet, via a wired or wireless network connection). For example, the media server 1150 may communicate with one or more of the playback devices 1170 (e.g., devices configured to output a display of a stream of live content and/or a stream of a VOD content item) and one or more other servers 1180. The one or more playback devices 1170 may include the computing device 130 of FIGS. 1-2. In a particular embodiment, the media server 1150 may receive a media stream 1104. In an illustrative example, the media stream 1104 is received via one or more stream capture sources (e.g., a camera or a video encoder) or via one or more media content servers (e.g., a video on demand (VOD) database server or a server of a content delivery network (CDN)). Accordingly, the media stream 1104 may include a live stream or a VOD stream. In an illustrative example, the media stream 1104 corresponds to the live media stream 102 of FIG. 1.

The media server 1150 may support multiple coding technologies and protocols. For example, the media server 1150 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 1150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 1150 may support communication (e.g., adaptive streaming and non-adaptive streaming) protocols including, but not limited to, HLS, HDS, smooth streaming, and DASH (also known as MPEG-DASH or international organization for standardization (ISO)/international electrotechnical commission (IEC) 23009-1). The media server 1150 may also support RTMP (and variants thereof), real-time streaming protocol (RTSP), real-time transport protocol (RTP), a MPEG-2 transport stream (MPEG-TS), and the WOWZ protocol. Additional audio formats, video formats, coder/decoders (CODECs), and/or protocols may also be supported.

The media server 1150 may also include one or more transcoder(s) 1155. The transcoder(s) 1155 may include the transcoder 113 of FIG. 1. The transcoder(s) 1155 may be configured to transcode the media stream 1104 to generate multiple ABR rendition(s) 1165 of the media stream 1104. The ABR rendition(s) 1165 may be at least temporarily stored at one or more data storage device(s) 1159. The data storage device(s) 1159 may include the data storage device(s) 111 of FIG. 1. In a particular embodiment, the data storage device(s) 1159 also store VOD content 1158 and/or DVR content. For example, the transcoder(s) 1155 may transcode the VOD content 1158 to generate multiple ABR renditions of the VOD content 1158, so that the media server 1150 may provide VOD streams to one or more of the playback devices 1170.

The ABR rendition(s) 1165 of the media stream 1104 may correspond to different quality renditions of the media stream 1104. For example, the transcoder(s) 1155 may generate a high-quality ABR rendition of the media stream 1104 and/or may generate a lower-quality ABR rendition of the media stream 1104 that is suitable for streaming in low-bandwidth network conditions. The transcoder(s) 1155 may be configured to perform bitrate conversion, CODEC conversion, frame size conversion, etc. Moreover, such transcoding may be performed in response to requests from the playback devices 1170. Thus, the media server 1150 may be able to generate multiple ABR rendition(s) 1165 of the media stream 1104 for different playback devices 1170 experiencing different network conditions.

The one or more ABR rendition(s) 1165 may be sent to the one or more playback devices 1170. Moreover, as described herein, each of the one or more ABR rendition(s) 1165 may be used to communicate interactive content. In a particular embodiment, depending on a playback format supported by a requesting playback device 1170, and/or transcoding parameters in use by the transcoder(s) 1155, the media server 1150 may send one or more ABR renditions to the playback devices 1170 based on requests received from the playback devices 1170. In a particular embodiment, parameters used by the transcoder(s) 1155 are stored in one or more transcoding template(s) 1156. For example, the transcoding template(s) 1156 may be computer-readable files (e.g., XML files) that define transcoding parameters (e.g., bitrate, type of CODEC, etc.) for various stream renditions.

The media server may also include an injector 1157, which may operate as described with reference to the injector 114 of FIG. 1. For example, the injector 1157 may inject interactive content 1141 or 1142 into a media stream based on interactive content rules 1153 for communication to the playback devices 1170 and other servers 1180. Additionally or alternatively, the interactive content 1141 or 1142 may be selected based on content provider preferences, user identifying information, user preferences, user history information, location information, client device information (e.g., hardware and software identification), a selected media stream, and/or interactions with previously received interactive content. In other implementations, the interactive content 1141 or 1142 is specified by the interactive content server 1140.

During operation, the media server 1150 may perform transcoding of the media stream 1104 (and/or the VOD content 1158) for adaptive streaming. As described above, adaptive streaming is a media transmission mechanism that enables a receiving device to dynamically request different versions of a stream in response to changing network conditions. For example, one of the playback devices 1170 (e.g., a desktop or laptop computing device 1171, a television or set-top box 1172, a smartphone 1173, or a tablet computer 1174) may initiate an adaptive streaming session with the media server 1150 for the media stream 1104 (and/or a particular VOD content 1158 item) by sending a first request 1162. In an illustrative example, the first request 1162 is generated in response to a user selecting a link to the media stream 1104 (e.g., on a webpage), where the link specifies an Internet address of the media server 1150. The media server 1150 may send a manifest 1163 to the initiating device (e.g., the computing device 1171) in response to the first request 1162. The manifest 1163 may include information describing each of the plurality of ABR rendition(s) 1165 (if any) of the media stream 1104 and/or the VOD content 1158 items. For example, the transcoding template(s) 1156 may define particular available ABR rendition(s) 1165 of the media stream 1104 and the manifest 1163 may be automatically generated based on the transcoding template(s) 1156.

Upon receiving the manifest 1163, the computing device 1171 may determine which (if any) of the available ABR rendition(s) 1165 of the media stream 1104 should be requested from the media server 1150. For example, the computing device 1171 may make such a determination based on buffering/processing capability at the computing device 1171 and/or network conditions being experienced by the computing device 1171. In a particular embodiment, the manifest 1163 may include or indicate interactive content for that is to be inserted in the media stream by the media server 1150 and is to be rendered by the computing device 1171.

Upon determining which ABR rendition should be requested, the computing device 1171 may transmit a second request 1164 to the media server 1150. The second request 1164 may specify a particular ABR rendition of the media stream 1104. If there are no problems with receipt and playback of the requested ABR rendition of the media stream 1104, the computing device 1171 may continue to receive the requested ABR rendition of the media stream 1104 for continued playback. However, if playback and/or network conditions become worse, the computing device 1171 may switch to a lower bitrate rendition by requesting a lower bitrate ABR rendition of the media stream 1104. Conversely, if playback and/or network conditions improve, the computing device 1171 may switch to a higher bitrate rendition. The transcoder(s) 1155 may generate key frame aligned portions for the adaptive streaming renditions, so that switching to a lower bitrate or higher bitrate ABR rendition appears "seamless" (e.g., does not result in noticeable visual glitches or dropped frames at a playback device 1170, such as the computing device 1171, the television/set-top box 1172, the smartphone 1173, or the tablet computer 1174).

Thus, during an adaptive streaming session, the media server 1150 may receive the second request 1164 from the computing device 1171 for a particular ABR rendition of the media stream 1104. Upon receiving the second request 1164, the media server 1150 may check whether the requested ABR rendition of the media stream 1104 is stored in the one or more data storage device(s) 1159. If so, the media server 1150 may respond to the second request 1164 by retrieving the requested ABR rendition from the one or more data storage device(s) 1159 and transmitting the requested ABR rendition to the computing device 1171. If the requested ABR rendition is part of a different ABR rendition, the transcoder(s) 1155 may generate the requested ABR rendition by transcoding the media stream 1104, and the generated ABR rendition(s) 1165 may be transmitted to the computing device 1171 in response to the second request 1164.

In a particular embodiment, sending the generated ABR rendition(s) 1165 to the computing device 1171 includes encoding and/or encapsulating the generated ABR rendition(s) 1165 in accordance with the adaptive streaming protocol being used by the computing device 1171 (e.g., HLS, HDS, smooth streaming, DASH, etc.). As additional adaptive streaming requests are received from the computing device 1171 for the same or other renditions of the VOD item, the transcoder(s) 1155 may generate the additional requested portions on the fly as needed. During an adaptive streaming session, the media server 1150 may use the ABR rendition(s) to provide embedded interactive content 1191 to the playback devices 1170. Thus, the present disclosure enables the media server 1150 to send the embedded interactive content 1191 to the playback devices 1170 regardless of what bitrate stream is being sent to the playback devices 1170. Alternatively, the media server 1150 may only include the embedded interactive content 1191 in high-bitrate renditions, because it may be difficult to communicate the embedded interactive content 1191 in a low-bitrate rendition without impacting playback quality at a playback device.

The described techniques may also be used to generate and transmit multiple ABR rendition(s) 1166 of the media stream 1104 and/or embedded interactive content 1196 from the media server 1150 to the other servers 1180, as shown. For example, the media server 1150 may transmit the ABR rendition(s) 1166 and the embedded interactive content 1196 to another media server 1181, a stream relay server, and/or to a server (e.g., an edge server) of a content delivery network (CDN) 1182. To illustrate, interactive content may be sent to edge servers of the CDN 1182 to make the interactive content more readily available for deployment to devices in different geographic regions. In a particular embodiment, requested content at the CDN 1182 may be set up using a pull through caching mechanism. The CDN 1182 may include one or more edge HTTP caching servers. If a cache miss for requested content occurs at a caching server, the caching server may pull the requested content from the media server 1150, which acts as an origin server.

The media server 1150 may request or determine interactive content during a streaming session. In some implementations, the media server 1150 transmits a first request 1106 to the interactive content server 1140 during the streaming session. The media server 1150 receives a first response 1108 from the interactive content server 1140 including the first interactive content 1141. The media server 1150 injects the first interactive content 1141 into the media stream during the streaming session. Additionally, the media server 1150 may transmit a second request 1110 to the interactive content server 1140. In a particular implementation, the second request 1110 is generated or determined based on user input from a particular playback device of the playback devices 1170. The media server 1150 receives a second response 1112 including the second interactive content 1142. Additionally or alternatively, the media server 1150 generates the requests 1106 and 1110 based on the interactive content rules 1153, user history, user location, user preferences, device location, content provider preferences, and/or interactions with previously received interactive content. In other implementations, the media server 1150 receives the interactive content 1141 and 1142 prior to conducting (e.g., opening) the streaming session and transmitting the media stream. In such implementations, the media server 1150 stores the interactive content 1141 and 1142 at the data storage device(s) 1159.

It is to be understood that the order of steps or operations described with reference to FIGS. 1-11 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof may include or may be included within any one or more of the media server 110, the computing device 130, the media server 1150, the desktop/laptop computing device 1171, the TV/set-top box 1172, the smartphone 1173, the tablet computer 1174, the media server/stream relay server 1181, a server (e.g., edge server) of the CDN 1182 of FIG. 11, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream and a "digital video recorder" (DVR) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

In a particular embodiment, a method includes receiving, at a media server, a request for a media stream from a client device. The method also includes sending, from the media server, a combined media stream to the client device via a streaming session. The combined media stream includes the requested media stream and interactive content, and the interactive content is configured to cause a media player of the client device to display the interactive content concurrently with the media stream.

In another particular embodiment, an apparatus includes a processor and a memory storing instructions that, when executed by the processor, cause the processor to perform operations including receiving a request for a media stream from a client device. The operations further include initiating sending a combined media stream to the client device via a streaming session. The combined media stream includes the requested media stream and interactive content, and the interactive content is configured to cause a media player of the client device to display the interactive content concurrently with the media stream.

In another particular embodiment, a method includes requesting, at a client device, a media stream from a media server. The method also includes receiving the requested media stream from the media server via a streaming session. The method includes receiving interactive content associated with the media stream. The method further includes executing the interactive content to display, via a media player of the client device, the interactive content concurrently with at least a portion of the requested media stream.

In another particular embodiment, a method includes requesting, at a client device, a media stream from a media server. The method also includes receiving a combined media stream from the media server via a streaming session. The combined media stream includes the requested media stream and interactive content. The method further includes displaying at least a portion of the requested media stream and the interactive content concurrently.

In another particular embodiment, a computer-readable storage device stores an installer package for a media player software application, where the installer package is executable by a processor of a computing device to perform operations including installing the media player software application at the computing device. The media player software application is executable by the processor to, during playback of a media stream, perform operations including executing interactive content embedded in a combined media stream, to render the interactive content to generate an output that includes the interactive content and video content of the combined media stream.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a media server, a request for a media stream from a client device;
sending via a streaming session, from the media server, a combined media stream to the client device, the combined media stream including the requested media stream and interactive content, wherein the interactive content is configured to cause a media player of the client device to display the interactive content concurrently with the requested media stream during the streaming session, wherein the combined media stream comprises data packets that include video, audio, or both of the media stream, and wherein the interactive content is included in headers of the data packets;
receiving, during the display of the interactive content concurrently with the requested media stream during the streaming session, a user selection corresponding to the interactive content; and
providing, via the streaming session, second interactive content to the client device based on the user selection, the second interactive content included in the combined media stream, wherein the second interactive content comprises Hypertext Markup Language (HTML) code or Extensible Markup Language (XML) code, and wherein the second interactive content is included in headers of the data packets.

2. The method of claim 1, wherein the streaming session complies with a hypertext transfer protocol (HTTP) Live Streaming (HLS) protocol, an HTTP Dynamic Streaming (HDS) protocol, a Dynamic Adaptive Streaming over HTTP (DASH) streaming protocol, or a WOWZ streaming protocol.

3. The method of claim 1, wherein the interactive content is sent in a Hypertext Markup Language (HTML) format or an Extensible Markup Language (XML) format.

4. The method of claim 1, wherein the interactive content includes placement information, wherein the interactive content indicates a start time to display the interactive content, and wherein the interactive content includes at least one of a duration or an end time.

5. The method of claim 1, wherein the interactive content includes text, links to graphics, links to Cascading Style Sheets (CSS) files, links to media, script languages or a combination thereof.

6. The method of claim 1, wherein the interactive content includes games, puzzles, quiz questions, advertisements, a Hypertext Markup Language (HTML) based application, or a combination thereof.

7. The method of claim 1, wherein the interactive content is injected into the combined media stream as network abstraction layer (NAL) units, and wherein the second interactive content is injected into the combined media stream as NAL units.

8. The method of claim 1, further comprising:
sending a manifest to the client device responsive to receiving the request for the media stream, the manifest indicating a plurality of adaptive bitrate (ABR) renditions of the media stream;
receiving a response from the client device indicating a particular ABR rendition of the media stream of the plurality of ABR renditions of the media stream; and
sending, from the media server via the streaming session to the client device, the particular ABR rendition of the media stream based on receiving the response, wherein providing, via the streaming session, the second interactive content to the client device based on the user selection includes injecting the second interactive content into at least one ABR rendition of the media stream of the plurality of ABR renditions of the media stream indicated in the manifest.

9. The method of claim 1, wherein the headers of the data packets further include placement information associated with the interactive content.

10. The method of claim 1, wherein sending the combined media stream to the client device includes sending a plurality of adaptive bitrate (ABR) renditions of the media stream to the client device, each of the plurality of ABR renditions including the interactive content.

11. The method of claim 1, wherein sending the combined media stream to the client device includes sending a plurality of adaptive bitrate (ABR) renditions of the media stream to the client device, wherein at least one of the plurality of ABR renditions includes the interactive content, and wherein at least one of the plurality of ABR renditions does not include the interactive content.

12. An apparatus comprising:
a processor; and
a memory storing instructions that, when executed by the processor, cause the processor to perform operations comprising:
receiving a request for a media stream from a client device;
initiating sending via a streaming session, from the processor, a combined media stream to the client device, the combined media stream including the requested media stream and interactive content, wherein the interactive content is configured to cause a media player of the client device to display the interactive content concurrently with the requested media stream during the streaming session, wherein the combined media stream comprises data packets that include video, audio, or both of the media stream, and wherein the interactive content is included in headers of the data packets;
receiving, during the display of the interactive content concurrently with the requested media stream during the streaming session, a user selection corresponding to the interactive content; and
providing, via the streaming session, second interactive content to the client device based on the user selection, the second interactive content included in the combined media stream, wherein the second interactive content is included in headers of the data packets.

13. The apparatus of claim 12, further comprising an injector configured to inject the interactive content into the media stream to generate the combined media stream.

14. The apparatus of claim 12, further comprising a network interface configured to:
receive the request;
request the interactive content from an interactive content provider; and
send the combined media stream.

15. The apparatus of claim 12, wherein the operations further comprise selecting the interactive content based on content provider preferences, user preferences, interactions with received interactive content, or a combination thereof.

16. A method comprising:
requesting, at a client device, a media stream from a media server;
receiving the requested media stream from the media server via a streaming session;
receiving interactive content associated with the requested media stream during the streaming session, wherein the requested media stream comprises data packets that include video, audio, or both, and wherein the interactive content is included in headers of the data packets;
executing the interactive content to display, via a media player of the client device, the interactive content concurrently with at least a portion of the requested media stream during the streaming session;
responsive to receiving, during display of the interactive content concurrently with at least the portion of the requested media stream during the streaming session, user input corresponding to the interactive content, sending data indicating the user input to the media server;
receiving, via the streaming session, second interactive content based on the data indicating the user input, wherein the second interactive content is included in headers of the data packets; and
displaying at least a second portion of the requested media stream and the second interactive content concurrently.

17. The method of claim 16, wherein the media stream comprises a combined media stream that includes the requested media stream and the interactive content, and wherein the combined media stream is generated based on injecting the interactive content into the requested media stream as action message format (AMF) data packets.

18. The method of claim 17, wherein the interactive content is received via a side channel of the media stream.

19. The method of claim 16, wherein the interactive content comprises Hypertext Markup Language (HTML) code or Extensible Markup Language (XML) code, and wherein the interactive content is rendered in a first layer, the first layer overlying a second layer including the portion of the requested media stream.

20. The method of claim 16, further comprising installing the media player at the client device, the media player including an interactive content renderer, wherein the interactive content renderer executes the interactive content.

* * * * *